United States Patent [19]

Stuppy

[11] 4,153,981
[45] May 15, 1979

[54] ATTACHING ASSEMBLY FOR SHEET MATERIAL

[75] Inventor: Francis X. Stuppy, Greenwood, Mo.

[73] Assignee: Stuppy Floral, Inc., North Kansas City, Mo.

[21] Appl. No.: 824,282

[22] Filed: Aug. 15, 1977

[51] Int. Cl.² ............................................. A44B 21/00
[52] U.S. Cl. .................................... 24/243 K; 160/395
[58] Field of Search ............. 24/243 K; 160/395, 392; 135/15 CF

[56] References Cited

U.S. PATENT DOCUMENTS

| | | | |
|---|---|---|---|
| 1,390,608 | 9/1921 | Fleming | 24/243 K |
| 2,890,511 | 6/1959 | Campbell | 24/134 R |
| 3,256,579 | 6/1966 | Hoover | 24/134 R |
| 3,803,671 | 4/1974 | Stuppy | 24/243 K |
| 3,848,380 | 11/1974 | Assael | 160/395 |
| 3,965,546 | 6/1976 | Hickle | 24/243 K |
| 3,987,835 | 10/1976 | Bloomfield | 24/243 K |

FOREIGN PATENT DOCUMENTS

| | | | |
|---|---|---|---|
| 212516 | 5/1960 | Austria | 24/243 K |
| 2208822 | 10/1973 | Fed. Rep. of Germany | 24/243 K |

Primary Examiner—Bernard A. Gelak
Attorney, Agent, or Firm—Schmidt, Johnson, Hovey & Williams

[57] ABSTRACT

A sheet material securement, including a base presenting a recessed channel, is provided with an interlocking, material-holding element adapted to be frictionally received within the channel and having a groove extending longitudinally of the element for receiving a bladed tool to provide leverage when inserting the element into the channel. In preferred forms, the groove extends the full length of the element and the tool is configured to be complementally received within a substantial portion of the groove such that the element is not deformed along its length by torque developed during insertion into the channel. The position of the groove is such that its depthwise axis is oblique to the plane of the channel mouth when the element is coupled with the channel for holding the tool remote from the sheet material.

1 Claim, 4 Drawing Figures

ATTACHING ASSEMBLY FOR SHEET MATERIAL

This invention relates to assemblies for attaching sheet material to a support and particularly concerns an attaching assembly wherein one of the interlocking elements is provided with a uniquely configured, blade-receiving groove presenting a convenient receptor for a bladed leverage tool whereby coupling and uncoupling of the interlocking elements is greatly facilitated.

Sheet material attaching assemblies are known in the art as evidenced for example by U.S. Pat. No. 3,803,671 issued to Stuppy et al. Such devices typically comprise a pair of elongate, interlocking elements, one adapted to be complementally received within the other for clamping a marginal edge of the sheet material therebetween. In this manner, the sheet material can be tightly secured to any desired support without introducing localized stresses in the material which tend to cause tearing and subsequent failure of the securement.

While the above described devices have worked extremely well for their intended applications, it has sometimes proved difficult to couple and uncouple the interlocking elements due to the relatively tight frictional engagement of one with the other. In normal practice, installers of these assemblies have necessarily relied upon their own ingenuity in devising methods of coupling and uncoupling the interlocking elements. Typically during disassembly, a screwdriver, pry bar or other bladed lever type tool is used to pry the interlocked elements apart often resulting in damage to the secured sheet material when the tool inadvertently slips or is forced against a vulnerable area.

The above described problem is particularly undesirable in applications where the sheet material is periodically erected and dismantled as for example, in temporary greenhouse installations. Damage to the sheet material in such instances is extremely costly to the user inasmuch as he must replace otherwise reuseable material which has been damaged during installation or removal.

Accordingly, it is an important object of the present invention to provide a sheet material attaching assembly which can be assembled quickly and easily while at the same time permitting disassembly without the risk of damage to the secured sheet material.

In accordance with the foregoing object, it is another important object of my invention to provide a device as above wherein one of the interlocking elements has a strategically positioned, tool receiving groove to present a convenient engagement for a lever type tool whereby the assembly may be readily coupled and uncoupled.

It is yet another important aim of the invention to provide a material holding assembly as above wherein the position of the groove in the one element disposes the lever type tool remote from the sheet material during coupling and uncoupling of the elements.

Throughout the drawings there is shown a sheet material attachment assembly in the nature of a securement 10 including an elongate base 12 having a longitudinally extending channel 14 formed therein, and an elongate, interlocking element 16 adapted to be releasably coupled with the base 12 in frictional confinement within the channel 14.

Figure 1:
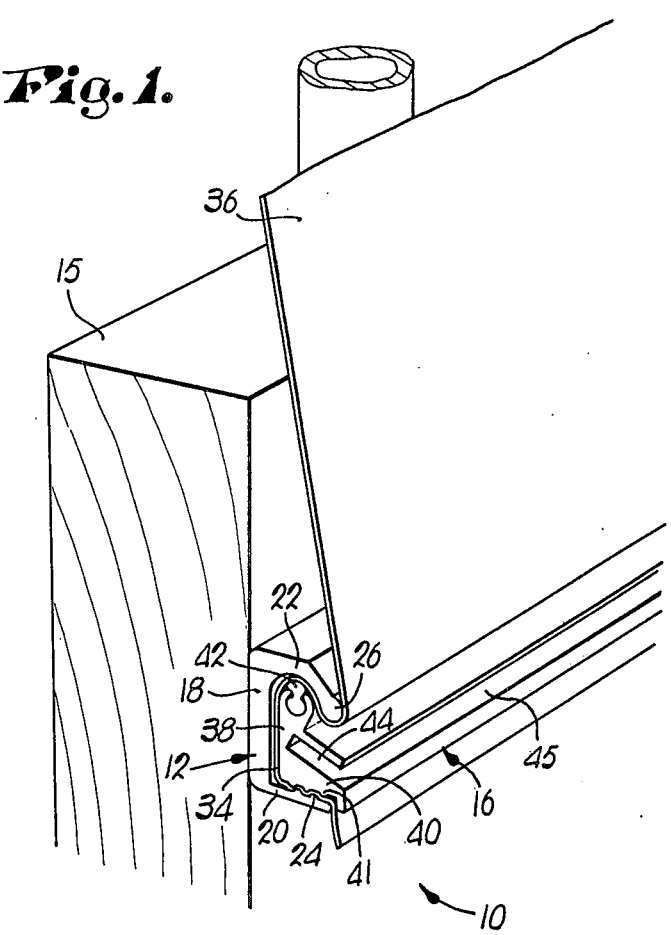
FIG. 1 is a fragmentary, perspective view of an attaching assembly for sheet material constructed in accordance with the principles of the present invention and shown mounted on a rigid support.

When installed in a horizontal disposition on a support 15 as shown for example in FIG. 1, the base 12 presents a generally C-shaped transverse cross-section having an upright spine 18, a lowermost straight leg 20 extending substantially perpendicularly from the spine 18 and an opposed, uppermost arcuate leg 22 projecting from the top end of spine 18 and curving toward the leg 20. The upper surface of the straight leg 20 is provided with a number of parallel, spaced, ribs 24 extending longitudinally of the channel 14. The end of the arcuate leg 22 remote from spine 18 forms an enlarged, substantially cylindrical edge 26 for a purpose to be described hereinbelow.

The channel 14 has a substantially flat, upright bottom 28 defined by the spine 18, an opposed open mouth 30 disposed in a substantially upright plane, and an uppermost bight section 32 formed by the arcuate leg 22. The channel 14 is adapted to receive a marginal portion 34 of a sheet of flexible material 36 as shown for example in FIGS. 3 and 4.

The interlocking element 16 is configured to be complementally received within the channel 14, having a generally L-shaped transverse cross-section presenting a first leg 38 adapted to be disposed in juxtaposition to the spine 18 and spanning the distance between the legs 20, 22 of base 12. A second leg 40 extends substantially perpendicularly to the leg 38 and is disposed adjacent the leg 20 in parallel relation thereto when element 16 is coupled with the base 12. As shown in the drawings, the leg 38 has a resilient nose member 42 adapted to be received within the bight section 32 of the channel 14 for the purpose of providing increased frictional engagement between the latter and the interlocking element 16. A number of spaced ribs 41 are disposed on the outer surface of leg 40 and extend parallel to the longitudinal axis of the element 16 for grippingly engaging the ribs 24 on the leg 20.

Figure 4:
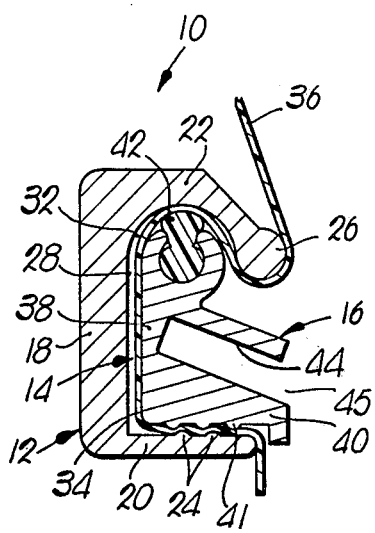
FIG. 4 is an enlarged, cross-sectional view showing the assembly in its coupled position.
Figure 2:
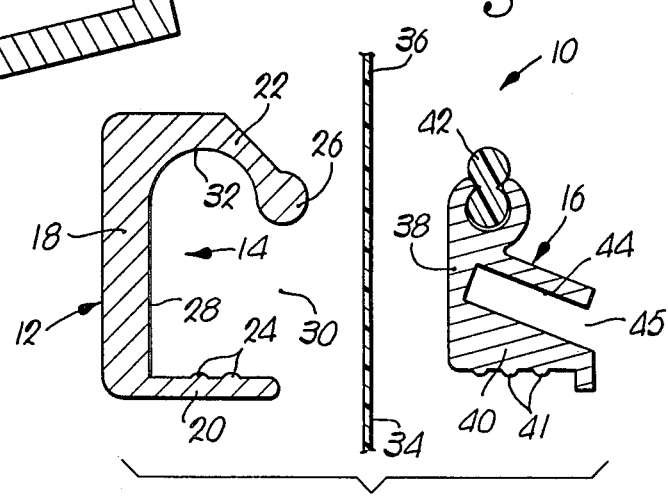
FIG. 2 is an enlarged, exploded, cross-sectional view showing the interlocking elements and a sheet of flexible material.

An elongate, tool-receiving groove 44 is formed in the second leg 40 and has a generally rectangular cross-section presenting an elongate opening 45 as shown for example in FIG. 2. The groove 44 extends the full length of the element 16 and, as shown in FIG. 4, the depth-wise axis of groove 44 extends obliquely of the first leg 38 such that when the element 16 is inserted into the channel 14, the depth-wise axis is also oblique relative to the upright plane containing the open mouth. In the preferred embodiment, the depth-wise axis of groove 44 slants upwardly when element 16 is coupled with the base 12 as shown in FIG. 1, whereby the opening 45 is disposed below the remaining portion of groove 44.

Figure 3:
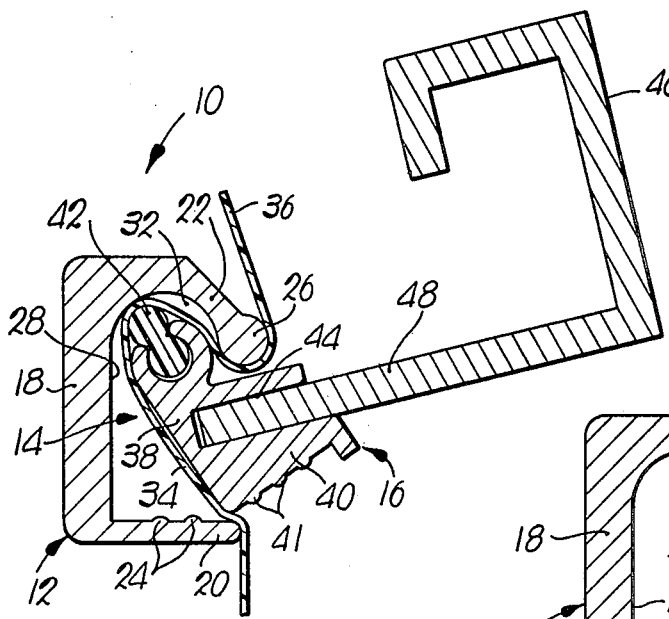
FIG. 3 is an enlarged, cross-sectional view showing the elements partially coupled and one element in engagement with a bladed tool.

The groove 44 is adapted to hold a lever type tool 46 by complementally receiving a blade 48 on the latter as shown for example in FIG. 3. The blade 48 has a thickness approximately equal to the width of the groove 44 and a width which is greater than the depth of groove 44.

In use, the base 12 and interlocking element 16 are initially spaced apart and the marginal portion 34 of the flexible material 36 is disposed therebetween as shown in FIG. 2. The operator first inserts the blade 48 of tool 46 into the groove 44 to provide a convenient handle and lever for manipulating the interlocking element 16.

With the tool 46 held to the interlocking element 16 by the groove 44, the operator initiates the coupling operation by placing the marginal portion 34 within the channel 14 followed by insertion of the nose 42 through the mouth 30 to a position resting within the bight section 32 as shown in FIG. 3. Next, the operator applies downward pressure on the tool 46 which rocks the element 16 about an axis extending parallel to the longitudinal axis of the latter causing resilient yielding of the nose 42 and movement of the element 16 to the position shown in FIG. 4 wherein the first leg 38 extends substantially parallel to the spine 18 and the marginal portion 34 is tightly clamped between the channel 14 and the element 16. Note particularly that the element 16 is frictionally held within the channel 14 due at least in part to the biasing provided by the deformed nose 42. This holding action is augmented by the gripping engagement between the ribs 24 on leg 20 and the corresponding ribs 41 on the second leg 40.

With the element 16 so positioned in the channel 14 of base 12, the flexible material 36 is positively held along its marginal portion 34. The cylindrical edge 26 provides a smooth transition for engagement of the material 36 with the base 12 and, in combination with the bight section 32 of channel 14, defines a positive double-back holding structure which prevents undesired slipping of the marginal portion 34 from its clamped position.

When it is desired to remove the flexible material 36 from its secured position, it is but a simple matter to uncouple the element 16 from the base 12 to release the marginal portion 34. The operator merely inserts the blade 48 of the tool 46 into the tool-holding groove 44. In this connection, note that the location of the opening 45 of the groove 44 together with the oblique attitude of the depthwise axis of the latter dispose the tool 46 in an easily manipulated position remote from the material 36 such that the likelihood of damage to the latter by the tool 46 is minimal. A slight upward lifting force on the tool 46 rocks the element 16 from its frictionally engaged position within the channel 14 such that the element 16 may be easily removed therefrom with the second leg 40 in leading relationship. The position of the groove 44 relative to the mouth 30 assures adequate clearance for pivoting the tool 46 during this uncoupling operation without fear of damaging the material 36.

From the foregoing, it can be appreciated that the present invention offers a significant improvement over prior art devices from the standpoint of efficient assembly and disassembly. The operator is not required to rely upon his own ingenuity to determine how best to remove the element 16 from the channel 14 but rather is provided with a positive, strategically placed tool-engaging groove 44 such that the element 16 can be easily manipulated without fear of damaging the flexible material 36. This improvement becomes even more significant when it is realized that installation and removal of temporary flexible coverings in greenhouses and similar structures is typically performed by in-shop labor rather than by skilled construction workers. Hence, there is an unsatisfied demand for a device such as securement 10 which offers essentially foolproof assembly and disassembly.

Additionally, by providing the groove 44 along the full length of the element 16, the operator can engage the latter at several points therealong to avoid deformation caused by torque on the element 16 during installation. In this connection, it is contemplated that the blade 48 of tool 46 would be several inches long to engage a substantial portion of the groove 44.

I claim:

1. In combination:
   a sheet material securement including:
   an elongated base having a longitudinally extending channel formed therein and of generally C-shaped transverse cross section for receiving therein a marginal portion of the sheet material, said channel presenting a normally uppermost bight section and a normally horizontally disposed mouth;
   an elongated interlocking element having a generally L-shaped transverse cross section and complementally receivable within said channel, said element having a first leg partially received by said bight section of the channel and a second leg partially received by said mouth;
   a tool receiving groove formed in said second leg and extending parallel to the longitudinal axis of said element, the depth-wise axis of the groove extending obliquely of said element when the element is received within the channel whereby to incline said groove downwardly in a direction extending from said first leg through said second leg; and
   a tool for said securement having an elongated blade receivable within said groove to provide leverage for insertion and removal of said element with respect to said channel.

* * * * *